US009916937B2

(12) United States Patent
Hirahara et al.

(10) Patent No.: US 9,916,937 B2
(45) Date of Patent: Mar. 13, 2018

(54) ALL-SOLID-STATE CAPACITOR

(71) Applicants: KYOCERA Corporation, Kyoto-shi, Kyoto (JP); ENERGY STORAGE MATERIALS LLC., Fujisawa-shi, Kanagawa (JP)

(72) Inventors: Seiichirou Hirahara, Kirishima (JP); Tomoyuki Ono, Kirishima (JP); Fumito Furuuchi, Kagoshima (JP); Maiko Nagayoshi, Kirishima (JP); Youji Seki, Kagoshima (JP); Shuichi Kasai, Kagoshima (JP); Takaaki Tsurumi, Fujisawa (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 11 days.

(21) Appl. No.: 15/027,318

(22) PCT Filed: Sep. 29, 2014

(86) PCT No.: PCT/JP2014/075959
§ 371 (c)(1),
(2) Date: Apr. 5, 2016

(87) PCT Pub. No.: WO2015/056558
PCT Pub. Date: Apr. 23, 2015

(65) Prior Publication Data
US 2016/0247635 A1    Aug. 25, 2016

(30) Foreign Application Priority Data
Oct. 18, 2013   (JP) ................. 2013-217563

(51) Int. Cl.
*H01G 11/56*   (2013.01)
*H01G 4/12*    (2006.01)
(Continued)

(52) U.S. Cl.
CPC .......... *H01G 11/56* (2013.01); *C01G 23/003* (2013.01); *C04B 35/462* (2013.01);
(Continued)

(58) Field of Classification Search
CPC ........ H01G 11/04; H01G 11/28; H01G 11/42; H01G 11/32; H01G 4/06; H01G 4/12; H01G 4/30; H01G 9/00
See application file for complete search history.

(56) References Cited

U.S. PATENT DOCUMENTS

2004/0105214 A1*  6/2004  Nakamura .............. H01G 4/30
361/321.2
2004/0222493 A1* 11/2004  Sato ..................... H01G 4/005
257/532
(Continued)

FOREIGN PATENT DOCUMENTS

EP         2978004 A1     1/2016
JP       2008-130844     6/2008
(Continued)

OTHER PUBLICATIONS

Extended European Search Report, European Patent Application No. 14854440.6, dated Jun. 6, 2017, 10 pgs.
(Continued)

*Primary Examiner* — Nguyen Ha
(74) *Attorney, Agent, or Firm* — Volpe and Koenig, P.C.

(57) ABSTRACT

All-solid-state capacitor includes an inorganic solid electrolyte, and a pair of current collectors disposed so that the inorganic solid electrolyte is interposed therebetween. In the all-solid-state capacitor, the inorganic solid electrolyte has a polycrystalline structure composed of crystal particles and crystal grain boundaries formed between the crystal particles. In a first crystal particle included in the crystal
(Continued)

particles, a domain located near the crystal grain boundaries is larger in size than a domain located near the center.

9 Claims, 4 Drawing Sheets

(51) Int. Cl.
*C04B 35/462* (2006.01)
*C04B 35/626* (2006.01)
*C01G 23/00* (2006.01)
*H01G 11/66* (2013.01)

(52) U.S. Cl.
CPC .. *C04B 35/62675* (2013.01); *C04B 35/62685* (2013.01); *H01G 4/12* (2013.01); *H01G 4/1218* (2013.01); *H01G 4/1281* (2013.01); *H01G 11/66* (2013.01); *C01P 2002/72* (2013.01); *C01P 2004/04* (2013.01); *C04B 2235/3201* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3227* (2013.01); *C04B 2235/6562* (2013.01); *C04B 2235/85* (2013.01)

(56) References Cited

U.S. PATENT DOCUMENTS

| 2006/0016291 | A1* | 1/2006 | Kataoka | B22F 9/24 75/245 |
| 2006/0023399 | A1* | 2/2006 | Fujioka | B32B 18/00 361/321.2 |
| 2008/0117563 | A1* | 5/2008 | Nagata | H01G 9/038 361/502 |
| 2010/0014214 | A1 | 1/2010 | Yamazaki et al. | |
| 2012/0162854 | A1 | 6/2012 | Iwanaga | |

FOREIGN PATENT DOCUMENTS

| JP | 2012-138502 | 7/2012 |
| JP | 5046700 B2 | 10/2012 |

OTHER PUBLICATIONS

Mei, A., et al., "Role of amorphous boundary layer in enhancing ionic conductivity of lithium-lanthanum-titanate electrolye," Electrochimica Acta 55 (2010), pp. 2958-2963.

Deng, Y., et al., "The preparation and conductivity properties of Li0.5La0.5TiO3/inactive second phase composites," Journal of Alloys and Compounds 472 (2009), pp. 456-460.

* cited by examiner (a)

(b)

(a)

(b)

22

ALL-SOLID-STATE CAPACITOR

TECHNICAL FIELD

The present invention relates to an all-solid-state capacitor, and more particularly to a solid electrolyte of the all-solid-state capacitor.

BACKGROUND ART

In addition to higher level of performance capability, further downsizing is demanded in various electronic equipment, including information equipment, communications equipment, and household electrical appliances, and this trend has created a need for each electronic component to be mounted in electronic equipment to be adapted for the sophisticated and downsized electronic equipment. One of electronic components that are mounted in electronic equipment is a capacitor. Capacitance is a performance characteristic demanded in a capacitor, wherefore the capacitor needs to be designed to have a small general size yet provide a high capacitance.

Multilayer ceramic capacitors described in Patent Literatures 1 and 2 utilize barium titanate as a dielectric body, and achieve a high capacitance by increasing the relative permittivity of the dielectric body.

In Patent Literature 3, an all-solid-state electric double layer capacitor is described. In the electric double layer capacitor, a high capacitance is realized using an electric double layer formed at an interface between an electrolyte and a current collector. In addition, as long as the capacitor is in an all solid state, a liquid electrolyte is not used and thus liquid leakage does not occur.

CITATION LIST

Patent Literature

Patent Literature 1: Japanese Examined Patent Publication JP-B2 5046700
Patent Literature 2: Japanese Unexamined Patent Publication JP-A 2012-138502
Patent Literature 3: Japanese Unexamined Patent Publication JP-A 2008-130844

SUMMARY OF INVENTION

Technical Problem

The relative permittivity of barium titanate is about several thousands to 10000 and it is difficult to satisfy both a high capacitance and downsizing in the multilayer ceramic capacitors disclosed in Patent Literatures 1 and 2. In addition, in the electric double layer capacitor disclosed in Patent Literature 3, a variation in capacitance with respect to the frequency of the voltage to be applied is large, and thus there is a problem that stabilized properties cannot be obtained.

An object of the invention is to provide an all-solid-state capacitor capable of achieving a high capacitance and downsizing and having small capacitance frequency dependence.

Solution to Problem

According to one embodiment of the invention, an all-solid-state capacitor includes an inorganic solid electrolyte having a polycrystalline structure, the polycrystalline structure being composed of crystal particles and crystal grain boundaries formed between the crystal particles, and a pair of current collectors disposed so that the inorganic solid electrolyte is interposed therebetween, the crystal particles including a first crystal particle having ionic conductivity, the first crystal particle being composed of a plurality of domains, a domain of the plurality of domains which is located near the crystal grain boundaries of the crystal particles being larger in size than a domain of the plurality of domains which is located near centers of the crystal particles.

Advantageous Effects of Invention

According to the invention, it is possible to provide an all-solid-state capacitor capable of achieving a high capacitance and downsizing and having small capacitance frequency dependence.

BRIEF DESCRIPTION OF DRAWINGS

The object, features and advantages of the invention will become more apparent from the following detailed description and the attached drawings.

FIG. 3 is a photograph of crystal particles in Sample No. 1 obtained by a transmission electron microscope (TEM), wherein FIG. 3(a) is a photograph near the center of crystal particles, and FIG. 3(b) is a photograph near a crystal grain boundary; and FIG. 4 is a photograph of a first crystal particle in Sample No. 4 obtained by a transmission electron microscope (TEM), wherein FIG. 4(a) is a photograph near the center of crystal particles, and FIG. 4(b) is a photograph near a crystal grain boundary.

DESCRIPTION OF EMBODIMENTS

Now, preferred embodiments of the invention will be described in detail with reference to the drawings.

Figure 1:
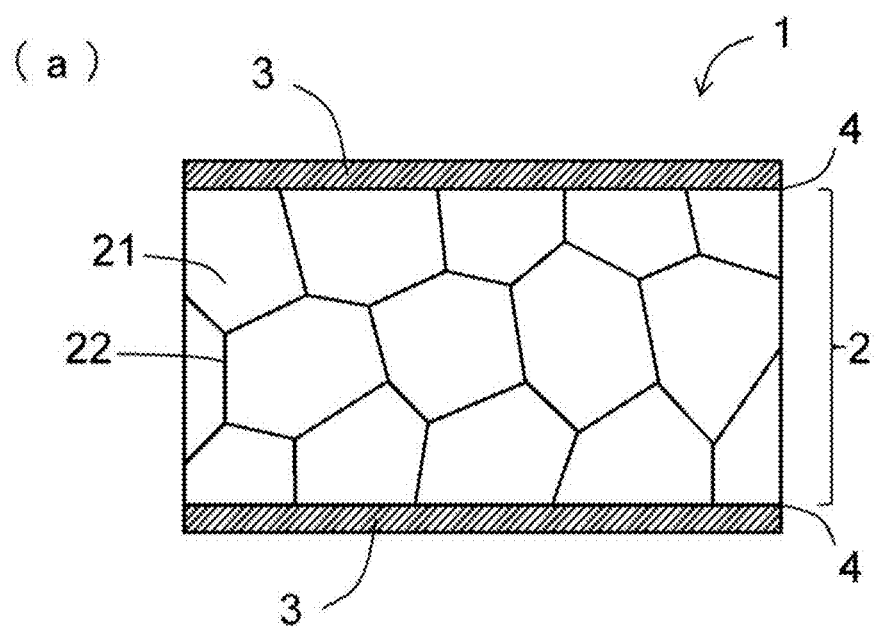
FIG. 1(a) is a cross-sectional view schematically showing an all-solid-state capacitor 1 according to an embodiment of the invention.
FIG. 1(b) is a cross-sectional view showing a part of FIG. 1(a) in an enlarged manner.
Figure 1:
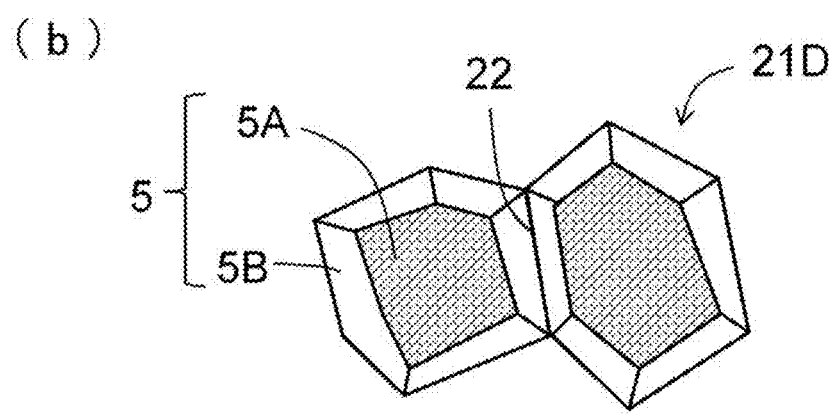
Figure 2:
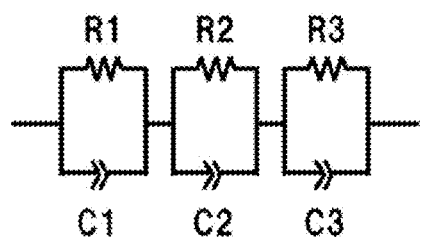
FIG. 2 is an equivalent circuit diagram used for impedance analysis.

FIG. 1 is a cross-sectional view schematically showing the configuration of an all-solid-state capacitor 1 according to an embodiment of the invention. The all-solid-state capacitor 1 of the embodiment includes an inorganic solid electrolyte 2, and a pair of current collectors 3 provided with the inorganic solid electrolyte 2 interposed therebetween. The current collector 3 is formed of a metal material containing at least one selected from Au, Ag, Ni, Pd and Cu as a main component. Although not particularly limited, the thickness of the current collector 3 is, for example, 0.5 to 3.0 μm.

The inorganic solid electrolyte 2 constituting the all-solid-state capacitor 1 of the embodiment has a polycrystalline structure, the polycrystalline structure being composed of a plurality of crystal particles 21 and crystal grain boundaries 22 formed between the crystal particles 21. For example, alkali metal ions such as Li ions move into the crystal particles 21. Due to the movement of the alkali metal ions, an electric double layer is formed at interfaces 4 between the current collectors 3 and the inorganic solid electrolyte 2, and at the crystal grain boundaries 22, and the capacitance of a dielectric body such as ion polarization, interfacial polarization, or orientation polarization, in the crystal particles 21 and at the crystal grain boundaries 22 is superimposed and a high capacitance can be obtained.

Typically, R1, R2 and R3 as electric resistance components in the all-solid-state capacitor 1 satisfy the following relational expression.

$$R1<R2<R3 \qquad \text{Expression 1,}$$

wherein R1 denotes the resistance in the crystal particles of the inorganic solid electrolyte 2, R2 denotes the resistance at the crystal grain boundary, and R3 denotes the resistance at the interface between the inorganic solid electrolyte 2 and the current collector 3.

This is because while the inorganic solid electrolyte 2 having a polycrystalline structure includes the crystal particles 21 having high ionic conductivity, at the interface between the crystal particles 21, that is, at the crystal grain boundaries 22, ion conduction resistance is increased due to a discontinuous ion conduction path, and contact resistance is further added at the interface 4 between the inorganic solid electrolyte 2 and the current collector 3.

Accordingly, with respect to the capacitance of the all-solid-state capacitor 1, in a lowest frequency region among the frequencies of the voltage to be applied to the all-solid-state capacitor 1 (hereinafter, also simply referred to as "application voltage"), the capacitor has relatively high ion conduction resistance, and the interfacial capacitance at the interface 4 between the inorganic solid electrolyte 2 and the current collector 3 (hereinafter, also simply referred to as "interfacial capacitance") in which ion frequency responsiveness is low is dominant. In addition, in a highest frequency region, the capacitor has relatively low ion conduction resistance, and the intra-crystal-particle capacitance in which ion frequency responsiveness is high (hereinafter, also simply referred to as "intragranular capacitance") is dominant. In an intermediate frequency region, the capacitor has intermediate ion conduction resistance, and the crystal grain boundary capacitance in which ion frequency responsiveness is intermediate (hereinafter, also simply referred to as "intergranular capacitance") is dominant.

This is because the interfacial capacitance is dominant in a region in which the frequency of the application voltage is low, but as the frequency increases, the intergranular capacitance and the intragranular capacitance have influence on the interfacial capacitance in this order as series capacitance. In this manner, a new capacitance component to be exhibited has a relatively low capacitance as the frequency of the application voltage increases, and thus frequency dependence that the capacitance of the capacitor rapidly decreases occurs.

The crystal used as the inorganic solid electrolyte 2 has a fine domain structure 5 including a plurality of single crystal regions having different crystal orientations from one another. Since the crystal orientations are different at the boundaries between the domains, the ions are scattered and ion conduction resistance is generated. Accordingly, in the case where a large number of fine domains are present, the number of boundaries of regions (domains) having different crystal orientations is increased, and thus the ionic conductivity in the crystal is decreased.

In the embodiment, the plurality of crystal particles 21 include a first crystal particle 21D, and the first crystal particle 21D has a domain structure 5 composed of a plurality of domains. It is important that, in the first crystal particle 21D, a domain 5B of the plurality of domains which is located near the crystal grain boundaries 22 of the crystal particles 21 is larger in size than a domain 5A of the plurality of domains which is located near the center of the crystal particle 21. That is, in the first crystal particle 21D, even in a state where the ion conduction resistance near the center of the first crystal particle 21D is higher than that of the fine domain 5A, a small number of the domain boundaries are maintained by the domain 5B having a large size near the crystal grain boundaries 22, that is, in the outer circumferential portion. Thus, the ionic conductivity of the outer circumferential portion can be maintained at a high level, the relative permittivity of the inorganic solid electrolyte 2 can be increased, and the capacitance of the all-solid-state capacitor 1 can be increased. The fact that the domain 5B is located near the crystal grain boundaries 22 indicates that at least a part of the domain 5B is adjacent to the crystal grain boundaries 22, or one to three other domains are present between the domain 5B and the crystal grain boundaries 22.

The domain structure 5 inside the first crystal particle 21D can be confirmed by, for example, a transmission electron microscope (TEM). In the embodiment, in the first crystal particle 21D, the size of the domain 5A located near the center of the crystal particle 21 is about 30 nm or less and the size of the domain 5B located near the crystal grain boundaries 22 is about 30 to 300 nm although the range varies depending on the size and shape of the first crystal particle 21D. Here, the size of the domain basically refers to the size of the domain in the major axis direction but in the case where the domain 5B is adjacent to the crystal grain boundaries 22 and the shape thereof has a large aspect ratio of 3 or more, or in the case where the domain 5B surrounds the outer circumference of the first crystal particle 21D, the thickness from the crystal grain boundaries 22 to the boundaries between the domain 5B and other domains is considered as the size of the domain 5B.

In addition, at the crystal grain boundaries 22 formed between the crystal particles 21, the ions cannot move from one crystal particle 21 to another adjacent crystal particle 21 through the crystal grain boundaries 22. As the resistance to ion conduction between the crystal particles 22 with the crystal grain boundaries 22 interposed therebetween (intergranular resistance) increases, the responsiveness of the ions moving between the pair of current collectors 3 is decreased and the polarization frequency of the electric double layer polarization at the interface 4 between the inorganic solid electrolyte 2 and the current collector 3 becomes low. Accordingly, a frequency region in which the polarization at the crystal grain boundaries 22 is dominant becomes relatively wide, and the capacitance frequency dependence of the all-solid-state capacitor 1 is decreased.

A grain boundary phase having no ionic conductivity may be present at the crystal grain boundaries 22. The grain boundary phase may be crystalline or amorphous. Examples of such a grain boundary phase include oxides containing at least one element of Si and Ge.

It is preferable that the first crystal particle 21D is composed of a crystal phase having an ionic conductivity which varies depending on crystal orientation, and in the domain 5B located near the crystal grain boundaries 22, the crystal orientation having relatively high ionic conductivity among the crystal orientations of the first crystal particles 21D is directed along the crystal grain boundaries 22.

In the case where the first crystal particle 21D is composed of a crystal phase having an ionic conductivity which varies depending on crystal orientation, it is possible to control the movement direction of the ions by the crystal orientation. When the crystal orientation having a high ionic conductivity is directed along the crystal grain boundaries 22, in other words, the crystal orientation having a high ionic conductivity is directed along the outer circumference of the first crystal particle 21D, the ions easily move in the first crystal particle 21D along the outer circumference thereof and in a direction perpendicular to the outer circumference thereof, that is, in a direction crossing the crystal grain boundaries 22, the ions do not relatively easily move. Accordingly, in the first crystal particle 21D, the ion movement between the particles is further suppressed. Thus, the intergranular resistance is further increased, and a frequency region having a small capacitance frequency dependence of the all-solid-state capacitor 1 can further become wide.

In the embodiment, a second crystal particle having the domain structure 5 but not having the properties of the first crystal particle 21D and a third crystal particle having no domain structure may be included in the crystal particles 21, but the ratio of the first crystal particle 21D in the crystal particles 21 is preferably 30% or more in terms of a particle number ratio. When the ratio of the first crystal particle 21D in which the ions easily move near the crystal grain boundaries 22 in the particles is 30% or more, a frequency region in which the capacitance in an actual frequency band (1 Hz to 1 kHz) is flattened can become wide, that is, a region having a small capacitance frequency dependence can become wide. All the crystal particles 21 constituting the inorganic solid electrolyte 2 may be the first crystal particle 21D.

The ratio of the first crystal particle 21D in the crystal particles 21 may be obtained by observing about 20 crystal particles 21 using a transmission electron microscope (TEM), setting the crystal particles 21 having the domain structure thereinside and having the domain 5B located near the crystal grain boundaries 22 whose size is larger than the size of the domain 5A located near the center of the particle among the particles as the first crystal particle 21D, and calculating the ratio of the number of the first crystal particle 21D with respect to the total number of the observed crystal particles 21.

It is preferable that the first crystal particle 21D has a one-dimensional or two-dimensional ion conduction path. Specific examples of such crystals include β-eucryptite and β-alumina.

Particularly, in the case where the first crystal particle has a layered crystal structure having a two-dimensional ion conduction path, the ions move in a two-dimensional manner through an ion conductive layer, and the ions do not easily move in a direction perpendicular to the ion conductive layer. Accordingly, by orienting the ion conductive layer along the crystal grain boundaries 22 near the crystal grain boundaries 22 of the first crystal particle 21D, the ions easily move in the first crystal particle 21D along the outer circumferential surface of the particles and the ions do not easily move in the direction perpendicular to the outer circumference of the particles, that is, in a direction crossing the crystal grain boundaries 22.

In addition, anisotropy is generated in the ionic conductivity by forming a superlattice structure in a basic structure having a three-dimensional ion conduction path and high ionic conductivity, and the ion conduction resistance in a specific orientation is increased. Then, the basic structure behaves so as to have a two-dimensional ion conduction path. In this case, the ionic conductivity in the basic structure becomes high and even though the superlattice structure is formed, relatively high ionic conductivity is maintained. Thus, this case is preferable.

For example, for a perovskite crystal structure represented by a general expression $ABO_3$, in the case where elements constituting an A site are two (or more) elements A1 and A2 having different valence and ionic radii, a layered structure in which the elements A1 and A2 constituting the A site, and voids are potentially stabilized, that is, a crystal structure in which two layers of a layer having an A site which is mainly composed of A1 and a layer having an A site which is mainly composed of A2 and voids alternately appear is easily adopted and as a result, a superlattice structure appears. The presence or absence of the superlattice structure in the perovskite crystal structure can be confirmed by identifying a superlattice peak from X-ray diffraction (XRD) measurement of a sintered body or observing the crystal particles by a transmission electron microscope (TEM).

It is considered that the perovskite crystal structure having such a superlattice structure satisfies, for example, $M1_{(2-x)/3}M2_xM3O_3$ (wherein, M1 represents a rare earth element, M2 represents an alkali metal element, M3 represents a tetravalent metal element, and $0<x\leq0.5$ is satisfied). By solid solution of an alkali earth metal element, an alkali metal element other than M2, or the like, the domain 5B, in which the crystal orientation having a high ionic conductivity, that is, a layered crystal structure forming a superlattice structure, is directed along the crystal grain boundaries 22, is formed near the crystal grain boundaries 22 of the first crystal particle 21D.

Here, as a representative example of a material having a perovskite crystal structure with a superlattice structure, a sintered body of $La_{2/3-x}Li_{3x}TiO_3$ (wherein x satisfies $0<3x\leq0.5$; hereinafter, also referred to as LLTO) which is a composite oxide containing La, Li and Ti will be described specifically.

For LLTO, a superlattice structure in which two layers of a layer having La and Li as elements constituting an A site, the A site being mainly composed of La, and a layer having an A site that is mainly composed of Li and voids alternately appear, is easily adopted. In such a superlattice structure with layer separation, the ionic conductivity is higher in the layer mainly composed of Li and voids than in the layer mainly composed of La, and high ionic conductivity is exhibited in a two-dimensional orientation (in the layer). The domain of this case is a region having an aligned orientation of the superlattice structure. In the case where the LLTO particles having the superlattice structure are observed by a transmission electron microscope (TEM), La exhibits the highest luminance among the constituent elements. Thus, when the crystal particles are observed by emitting an electron beam from the a-axis and c-axis directions, it is found that there are layers in which La exhibiting the highest luminance is continuously observed, that is, layers having the A site which is mainly composed of La (La rich layer), and a La poor layer which is interposed between the La rich layers (a layer having the A site which is mainly composed of Li and voids). Li ions move in the La poor layer. The inorganic solid electrolyte 2 having a polycrystalline structure can be formed by sintering such LLTO into a sintered body. A part of Ti constituting the B site may be substituted by a pentavalent metal element such as Nb or Ta.

By further containing at least one element selected from the element group consisting of Na, K, Mg, Ca, Sr and Ba in such a sintered body of LLTO, in the domain 5B located near the crystal grain boundaries 22 of the first crystal particle 21D, the crystal orientation having a high ionic conductivity, that is, the layered structure forming a superlattice structure, is directed along the crystal grain boundaries 22. In the sintered body of LLTO, the content of the element group is preferably 1 to 9% by mass in total in terms of oxides.

The thickness of the inorganic solid electrolyte 2 is preferably a thickness of about several to ten crystal particles 21. Specifically, the thickness of the inorganic solid electrolyte 2 is 0.5 to 20 μm and preferably 1 to 10 μm. By setting the thickness of the inorganic solid electrolyte 2 to be in the above range, a variation in capacitance with respect to the frequency of the voltage to be applied to the all-solid-state capacitor 1, that is, the capacitance frequency dependence can be further decreased and thus a stable capacitor can be realized.

In addition, although not particularly limited, the thickness of the current collector 3 is, for example, 0.5 to 3.0 μm.

An example of the method of manufacturing the all-solid-state capacitor 1 according to the embodiment will be described.

With respect to the all-solid-state capacitor 1, for example, the inorganic solid electrolyte 2 is first fired, and the pair of current collectors 3 made of a metal material of Au, Ag, Ni, Pd, Cu, or the like is formed on the surface of the fired inorganic solid electrolyte 2 using an ion sputtering apparatus or the like. For example, a current collector paste including Ag/Pd and Ni is screen-printed on the surfaces of solid electrolyte sheets before firing, the sheets with the current collector paste are laminated, and then the solid electrolyte sheet and the current collector paste are co-fired in the atmosphere (in the case of Ag/Pd) or in a non-oxidizing atmosphere (in the case of Ni) according to the material for the current collector. In this manner, particularly, in the case of using the current collector 3 including Ag, firing can be performed in the atmosphere (in an oxidizing atmosphere) and thus the manufacturing cost can be reduced.

The inorganic solid electrolyte 2 can be prepared, for example, in the procedure of mixing of raw material powders for the crystal particles 21 having ionic conductivity, primary pulverizing, primary calcining, secondary calcining, secondary pulverizing, and firing. Regarding elements such as Na, K, Mg, Ca, Sr and Ba, powders of oxides or carbonates thereof may be mixed with the raw material powder after secondary pulverizing and then tertiary pulverizing may be performed. In addition, it is preferable that the calcined body after primary calcining is crushed and then secondary calcining is performed.

Specifically, for example, in the case of LLTO, the inorganic solid electrolyte 2 can be prepared by performing the primary calcining at a temperature of 800° C. for a holding time of 4 hours, performing the secondary calcining at a temperature of 1150° C. for a holding time of 12 hours, and performing the firing at a temperature of 1250° C. for a holding time of 6 hours.

Examples

An inorganic solid electrolyte composed of a sintered body including Ba and Sr, as alkali earth metal elements, or containing K, as an alkali metal element other than Li, as a main component having a composition formula $La_{2/3-x}Li_{3x}TiO_3$ (LLTO, wherein 3x=0.42) was prepared.

Specifically, a $La_2O_3$ powder having a purity of 99% or higher, a $Li_2CO_3$ powder and a $TiO_2$ (rutile type) powder were weighted such that 3x=0.42 was satisfied in the composition formula, and a raw material mixed power having a total weight of 100 g was prepared. To the raw material mixed powder, as a solvent, 150 g of isopropyl alcohol (IPA) was added, and thus slurry was obtained. The mixture was pulverized and mixed (primarily pulverized) by a rotary mill using a zirconia ball having a diameter of 10 mm for 15 hours.

Then, the slurry was dried with a rotary evaporator, the resultant was primarily calcined in the atmosphere at a calcining temperature of 800° C. for a holding time of 4 hours, and further secondarily calcined in the atmosphere at a calcining temperature of 1150° C. for a holding time of 12 hours. The powder obtained after the secondary calcining was crushed in a mortar, and IPA was further added to the crushed powder again to obtain slurry. The average particle diameter of the powder was pulverized and mixed (secondarily pulverized) by a rotary mill using a zirconia ball having a diameter of 10 mm until a predetermined average particle diameter was obtained.

Thereafter, the slurry was dried with a rotary evaporator and secondarily pulverized to obtain a powder. Any of a $BaCO_3$ powder having a purity of 98%, a $SrCO_3$ powder having a purity of 98% and a $K_2CO_3$ powder having a purity of 98% was mixed with the powder in a predetermined amount with respect to 100% by mass of the powder obtained after the secondary pulverizing, and IPA was added to the mixture to obtain slurry. The slurry was pulverized and mixed (tertiarily pulverized) by a rotary mill using a zirconia ball having a diameter of 10 mm for 15 hours. The amount of the $BaCO_3$ powder, the $SrCO_3$ powder and the $K_2CO_3$ powder to be added with respect to 100% by mass of the powder obtained after the secondary pulverizing is shown in Table 1 in terms of oxides.

After 5% by mass of paraffin wax was mixed with the powder obtained after the tertiary pulverizing, the mixture was press-molded by a die press with a pressure of 1 ton/cm$^2$, and thus a disk-like press molded body having a diameter of 15 mm and a thickness of 1.5 mm was prepared.

The press molded body was fired in the atmosphere under the conditions of a temperature rising rate of 400° C./hours, a firing temperature of 1250° C. for a holding time of 6 hours, and a temperature falling rate of 400° C./hours, and thus an inorganic solid electrolyte which is a disk-like sintered body having a diameter of 13 mm and a thickness of 1.3 mm was obtained.

(Identification of Crystal Phase)

From the result of X-ray diffraction (XRD) patterns of each sample obtained by subjecting the samples to X-ray diffraction measurement using an X-ray diffraction apparatus by a CuKα ray source in a range of 2θ=10 to 80°, crystal phases were identified. All the samples had a perovskite crystal structure of LLTO, and the diffraction peak derived from the supper lattice structure was confirmed.

(Evaluation of Domain Structure of Crystal Particles)

The obtained inorganic solid electrolyte was processed with a microtome, and 20 crystal particles for each sample were observed using a transmission electron microscope (TEM). In the crystal particles in which a domain structure could be confirmed, the size of the domain located near the crystal grain boundaries was compared with the size of the domain located near the center of the crystal particle, and a first crystal particle in which the size of the domain located near the crystal grain boundaries is apparently large, were extracted. Thus, the ratio of the first crystal particle was calculated from the number of the extracted particle. At the same time, the orientation of the domain located near the crystal grain boundaries of the first crystal particle was also confirmed. In all the samples, the crystal particles had a domain structure and the size of the domain located near the center of the crystal was about 30 nm or less. In addition, in Samples No. 2 to 6, the size of the domain located near the crystal grain boundaries was larger than the size of the domain located near the center, and the size was 30 to 300 nm in terms of a thickness from the crystal grain boundary to the domain boundary.

(Measurement of Relative Permittivity)

The front/rear surface of each sample was mirror-polished using a sand paper of #500 to #3000 and a diamond paste of #6000. The thickness was made to be 0.8 to 1.2 mm and then an Au electrode (current collector) having a diameter of 1 cm was formed on the front/rear surface using an ion sputtering apparatus (JEOL-JFC-1500).

In each sample in which the Au electrode was formed, using an impedance measuring device manufactured by Solartron in a frequency range of 0.01 Hz to 10 MHz and an impedance measuring device (type 4295A) manufactured by Agilent Technologies in a frequency range of 40 Hz to 110 MHz, an AC voltage of an effective voltage of 500 mV (Bias 0V) was applied, and a real part Z' and an imaginary part Z" of the impedance were measured.

A capacitance Cp (F) was calculated from the measured real part Z' and imaginary part Z", and further, a relative permittivity $\epsilon_r$ was calculated. First, the capacitance Cp was calculated by $Cp=Z''/(2\pi f(Z'^2+Z''^2))$ (f represents a frequency). In addition, it was considered that Expression $Cp=\epsilon_0\epsilon_r \times S/d$ ($\epsilon_0$ represents a dielectric constant in vacuum, S represents an electrode area, and d represents a thickness of a solid electrolyte) was established over the whole frequency range, and the relative permittivity $\epsilon_r$ was calculated as $\epsilon_r=Cp \times d/(\epsilon_0 \times S)$.

The evaluation results of each sample are shown in Table 1. In Table 1, as the frequency dependence of the relative permittivity, a ratio of a relative permittivity at a frequency of 1 Hz to a relative permittivity at a frequency of 1 kHz ($\epsilon_r$(1 Hz)/$\epsilon_r$(1 kHz)) was shown. As the value of the ratio approaches "1", it can be determined that the frequency dependence of the relative permittivity is decreased, that is, it can be determined that the frequency dependence of the capacitance is decreased. $\epsilon_r$(1 kHz) was preferably $1.0 \times 10^4$ or more and as long as $\epsilon_r$(1 Hz)/$\epsilon_r$(1 kHz)≤10, it was determined that the frequency dependence was sufficiently small and this case was preferable.

is found that both the vicinity (a) of the center of the crystal particle and the vicinity (b) of the crystal grain boundaries are composed of a domain having a size of about 30 nm or less. In Sample No. 1, all the crystal particles observed had the same structure. On the other hand, in Sample No. 4, as shown in FIG. 4, it is found that the vicinity (a) of the center of the crystal particle is composed of a domain having a size about 30 nm or less but the size of the domain is relatively large in the vicinity (b) of the crystal grain boundaries and the crystal orientation having a high ionic conductivity is directed along the crystal grain boundaries. An arrow expressed by a solid line in FIGS. 3 and 4 indicates a c-axis direction of the crystal orientation in each domain, and an arrow expressed by a broken line indicates a direction having a high ionic conductivity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1: All-solid-state capacitor
2: Inorganic solid electrolyte
21: Crystal particle
21D: First crystal particle
22: Crystal grain boundary
3: Current collector
4: Interface between inorganic solid electrolyte and current collector
5: Domain structure
5A: Region in which domain having small size is present near center of crystal particle
5B: Domain located near crystal grain boundaries

TABLE 1

| Sample No. | Additive | Amount of addition*1 % by mass | Ratio of first crystal particle % | Relative permittivity $\epsilon_r$(1 Hz) | Relative permittivity $\epsilon_r$(1 kHz) | $\epsilon_r$(1 Hz)/ $\epsilon_r$(1 kHz) |
|---|---|---|---|---|---|---|
| 1 | BaCO$_3$ | 0 | 0 | $4.0 \times 10^6$ | $1.0 \times 10^5$ | 40.0 |
| 2 | BaCO$_3$ | 1 | 15 | $8.3 \times 10^5$ | $9.0 \times 10^4$ | 9.3 |
| 3 | BaCO$_3$ | 3 | 30 | $1.3 \times 10^5$ | $4.7 \times 10^4$ | 2.8 |
| 4 | BaCO$_3$ | 5 | 90 | $1.3 \times 10^5$ | $5.9 \times 10^4$ | 2.1 |
| 5 | BaCO$_3$ | 7 | 80 | $7.5 \times 10^4$ | $5.0 \times 10^4$ | 1.5 |
| 6 | BaCO$_3$ | 9 | 50 | $7.4 \times 10^4$ | $3.5 \times 10^4$ | 2.1 |
| 7 | SrCO$_3$ | 5 | 35 | $1.3 \times 10^5$ | $5.2 \times 10^4$ | 2.5 |
| 8 | K$_2$CO$_3$ | 5 | 35 | $2.4 \times 10^5$ | $4.5 \times 10^4$ | 5.3 |

*1Amount expressed in terms of oxides

Samples No. 2 to 8 included first crystal particle in the electrolyte in the inorganic solid, and exhibited excellent properties that the relative permittivity at 1 kHz was $1.0 \times 10^4$ or more, the ratio of the relative permittivity at 1 Hz to the relative permittivity at 1 kHz was 10 or less. On the other hand, Sample No. 1 did not contain a first crystal particle, the ratio of the relative permittivity at 1 Hz to the relative permittivity at 1 kHz was as large as 40, and the frequency dependence of the relative permittivity was large.

Figure 3:
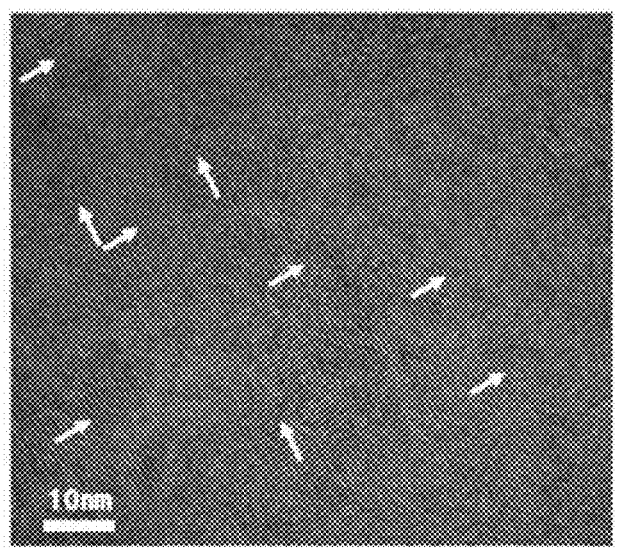
Figure 3:
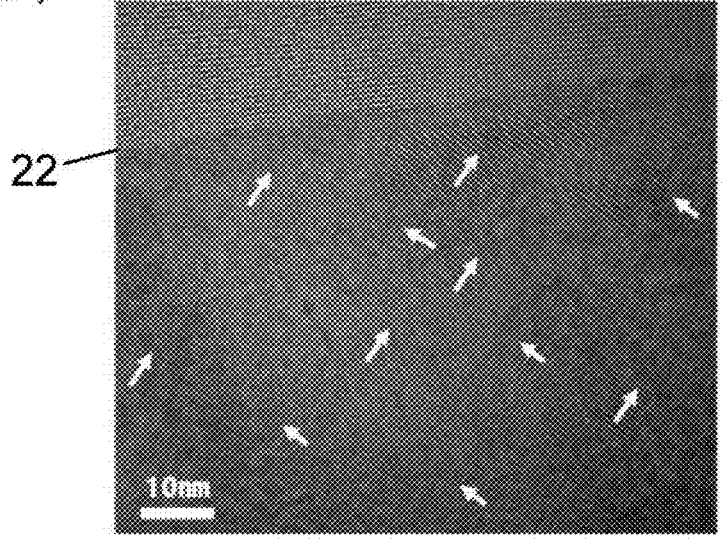
Figure 4:
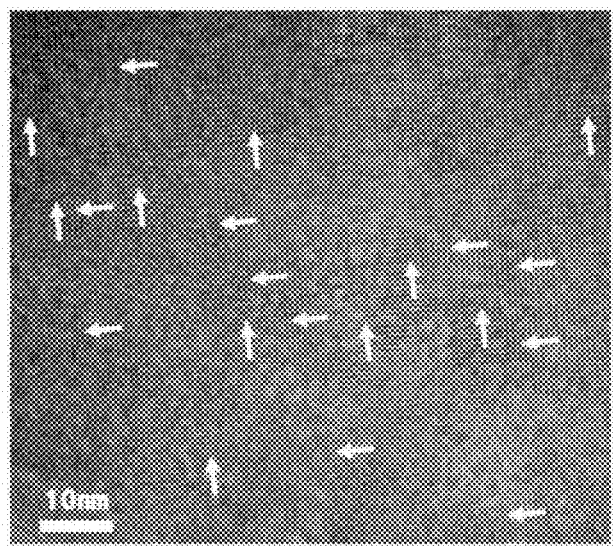
Figure 4:
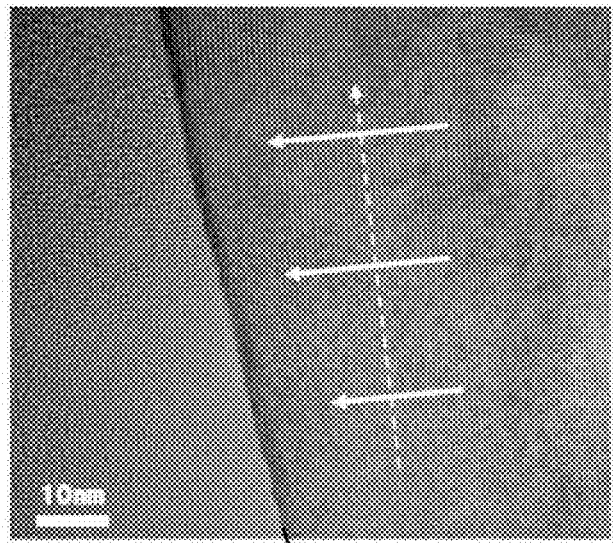

FIG. 3 is a photograph of crystal particles in Sample No. 1 obtained by a transmission electron microscope (TEM). It

The invention claimed is:

1. An all-solid-state capacitor, comprising:
an inorganic solid electrolyte having a polycrystalline structure, the polycrystalline structure being composed of crystal particles and crystal grain boundaries formed between the crystal particles; and
a pair of current collectors disposed so that the inorganic solid electrolyte is interposed therebetween,
the crystal particles including a first crystal particle having ionic conductivity, the first crystal particle comprising a plurality of domains,
the plurality of domains including a first domain near the crystal boundaries and a second domain nearer to the center of the crystal particle than the first domain,
the first domain of the first crystal particle being larger in size than the second domain of the first crystal particle.

2. The all-solid-state capacitor according to claim 1,
wherein the first crystal particle is composed of a crystal phase having an ionic conductivity which varies depending on crystal orientation, and
crystal orientation having a relatively high ionic conductivity in the first domain located near the crystal grain boundaries is directed along the crystal grain boundaries.

3. The all-solid-state capacitor according to claim 1,
wherein a ratio of the first crystal particle to the crystal particles is 30% or more in terms of a particle number ratio.

4. The all-solid-state capacitor according to claim 1,
wherein the first crystal particle has a one-dimensional or two-dimensional ion conduction path.

5. The all-solid-state capacitor according to claim 1,
wherein the crystal particles have a perovskite crystal structure with a superlattice structure.

6. The all-solid-state capacitor according to claim 1,
wherein the inorganic solid electrolyte includes a sintered body of a composite oxide including at least Li, La and Ti.

7. The all-solid-state capacitor according to claim 6,
wherein the sintered body further includes at least one element selected from an element group consisting of Na, K, Mg, Ca, Sr and Ba.

8. The all-solid-state capacitor according to claim 7,
wherein a content of the at least one element selected from the element group included in the sintered body is 1 to 9% by mass in total in terms of oxides.

9. The all-solid-state capacitor according to claim 1,
the all-solid-state capacitor including an electric double layer capacitor.

* * * * *